(12) United States Patent
Geesey

(10) Patent No.: US 12,477,996 B2
(45) Date of Patent: Nov. 25, 2025

(54) AGRICULTURAL BALER WITH MECHANISM TO LIMIT BALE ROLL AFTER EJECTION

(71) Applicant: CNH Industrial America LLC, New Holland, PA (US)

(72) Inventor: Daniel M. Geesey, East Petersburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 760 days.

(21) Appl. No.: 17/841,350

(22) Filed: Jun. 15, 2022

(65) Prior Publication Data

US 2023/0403982 A1    Dec. 21, 2023

(51) Int. Cl.
*A01F 15/07* (2006.01)

(52) U.S. Cl.
CPC .... *A01F 15/0715* (2013.01); *A01F 2015/076* (2013.01)

(58) Field of Classification Search
CPC ............ A01F 15/0715; A01F 2015/076; A01F 2015/0745
See application file for complete search history.

(56) References Cited

U.S. PATENT DOCUMENTS

| | | |
|---|---|---|
| 4,177,723 A | 12/1979 | Buchele et al. |
| 4,470,247 A * | 9/1984 | Mast ................ A01F 15/07 100/88 |
| 4,570,789 A | 2/1986 | Fritz et al. |
| 4,703,605 A | 11/1987 | Ackermann |
| 4,870,812 A | 10/1989 | Jennings et al. |
| 5,349,806 A * | 9/1994 | Swearingen .......... A01F 15/141 100/88 |

(Continued)

FOREIGN PATENT DOCUMENTS

| | | |
|---|---|---|
| CN | 212100125 U | 12/2020 |
| DE | 33 35 900 A1 | 4/1985 |

(Continued)

OTHER PUBLICATIONS

Extended European Search Report for EP Application No. 23179577.4 dated Nov. 6, 2023 (eight pages).

*Primary Examiner* — Joseph M Rocca
*Assistant Examiner* — Julia C Tran
(74) *Attorney, Agent, or Firm* — Buchanan Ingersoll & Rooney PC

(57) ABSTRACT

A wrapping assembly for an agricultural baler includes: a supply of wrapping material; a wrapping mechanism configured to wrap the wrapping material around a formed round bale; a protrusion inserter configured to insert a roll-reducing protrusion on a surface of the formed round bale; and a controller operably coupled to the wrapping mechanism and the protrusion inserter. The controller is configured to: output a wrap initiation signal to the wrapping mechanism so the wrapping mechanism begins wrapping the formed round bale; and output a protrusion insertion signal to the protrusion inserter so the roll-reducing protrusion is inserted on a surface of the formed round bale and is subsequently wrapped by wrapping material wrapped around the formed round bale by the wrapping mechanism.

20 Claims, 6 Drawing Sheets

(56) References Cited

U.S. PATENT DOCUMENTS

| | | | |
|---|---|---|---|
| 6,021,622 A * | 2/2000 | Underhill | A01F 15/0715 53/118 |
| 6,928,796 B2 * | 8/2005 | Viaud | A01F 15/0883 53/118 |
| 6,966,162 B2 * | 11/2005 | Viaud | A01F 15/0715 53/118 |
| 7,437,866 B2 * | 10/2008 | Smith | A01F 15/0833 56/341 |
| 8,516,779 B2 | 8/2013 | Bennett et al. | |
| 9,008,920 B1 | 4/2015 | Smith et al. | |
| 9,949,439 B2 | 4/2018 | Harchol et al. | |
| 10,239,278 B2 | 3/2019 | Castillo et al. | |
| 10,264,732 B2 * | 4/2019 | Porter | A01F 15/071 |
| 10,377,545 B2 | 8/2019 | Porter et al. | |
| 10,960,639 B2 * | 3/2021 | Castillo | B65B 11/04 |
| 11,142,382 B1 * | 10/2021 | Hayes | C09J 7/20 |
| 2001/0018821 A1 | 9/2001 | Chow | |
| 2007/0240389 A1 * | 10/2007 | Frerichs | A01F 15/0715 100/88 |
| 2010/0288140 A1 * | 11/2010 | Smith | A01F 15/0715 53/507 |
| 2014/0123616 A1 * | 5/2014 | Kuronen | A01F 15/08 56/341 |
| 2021/0076571 A1 | 3/2021 | Simmons et al. | |
| 2022/0061222 A1 * | 3/2022 | Pilcher | A01F 15/0715 |

FOREIGN PATENT DOCUMENTS

| | | |
|---|---|---|
| DE | 69308059 T2 | 6/1997 |
| EP | 2250875 B1 | 5/2019 |
| FR | 2 772 353 B1 | 1/2000 |

\* cited by examiner

AGRICULTURAL BALER WITH MECHANISM TO LIMIT BALE ROLL AFTER EJECTION

BACKGROUND OF THE INVENTION

The present invention pertains to agricultural balers and, more specifically, to agricultural balers that form round bales.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting unit, a main baling chamber for forming a bale, and a wrapping mechanism for wrapping or tying a material around the bale after it has been formed in the main baling chamber. One particular issue with round bales, which is less applicable to square bales, is that round bales have a tendency to roll after being ejected, especially when ejected on hilly terrain. Considering that round bales can weigh several thousand pounds, this tendency to roll can be a safety risk to both persons and property that are in the roll path of the bale.

What is needed in the art is a way to reduce the risk of an ejected round bale causing damage due to rolling.

SUMMARY OF THE INVENTION

Exemplary embodiments provided according to the present disclosure include a device and method for inserting a roll-reducing protrusion on a surface of a formed round bale that is subsequently wrapped in wrapping material.

In some exemplary embodiments provided in accordance with the present disclosure, a wrapping assembly for an agricultural baler includes: a supply of wrapping material; a wrapping mechanism configured to wrap the wrapping material around a formed round bale; a protrusion inserter configured to insert a roll-reducing protrusion on a surface of the formed round bale; and a controller operably coupled to the wrapping mechanism and the protrusion inserter. The controller is configured to: output a wrap initiation signal to the wrapping mechanism so the wrapping mechanism begins wrapping the formed round bale; and output a protrusion insertion signal to the protrusion inserter so the roll-reducing protrusion is inserted on a surface of the formed round bale and is subsequently wrapped by wrapping material wrapped around the formed round bale by the wrapping mechanism.

In some exemplary embodiments provided in accordance with the present disclosure, an agricultural baler includes: a chassis; a pickup carried by the chassis and configured to pick up crop material; a baling chamber carried by the chassis and configured to receive picked up crop material, the baling chamber including a roll assembly configured to form a round bale from picked up crop material; and a wrapping assembly carried by the chassis and including: a supply of wrapping material; a wrapping mechanism configured to wrap the wrapping material around a round bale formed in the baling chamber; a protrusion inserter configured to insert a roll-reducing protrusion on a surface of the formed round bale; and a controller operably coupled to the wrapping mechanism and the protrusion inserter. The controller is configured to: output a wrap initiation signal to the wrapping mechanism so the wrapping mechanism begins wrapping the formed round bale; and output a protrusion insertion signal to the protrusion inserter so the roll-reducing protrusion is inserted on a surface of the formed round bale and is subsequently wrapped by wrapping material wrapped around the formed round bale by the wrapping mechanism.

In some exemplary embodiments provided in accordance with the present disclosure, a method of forming a round bale with an agricultural baler includes: forming the round bale from crop material in a baling chamber; inserting a roll-reducing protrusion on a surface of the formed round bale; and wrapping the formed round bale and the roll-reducing protrusion with wrapping material from a roll to produce a wrapped round bale with the roll-reducing protrusion wrapped in the wrapping material and extending from the wrapped round bale in a manner that inhibits rolling of the wrapped round bale after ejection from the baling chamber.

One possible advantage that may be realized by exemplary embodiments provided according to the present disclosure is that the inserted protrusion can act as a stop to the bale rolling uncontrollably.

Another possible advantage that may be realized by exemplary embodiments provided according to the present disclosure is that the protrusion can be securely wrapped with the bale so the protrusion is unlikely to come off the bale during rolling.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
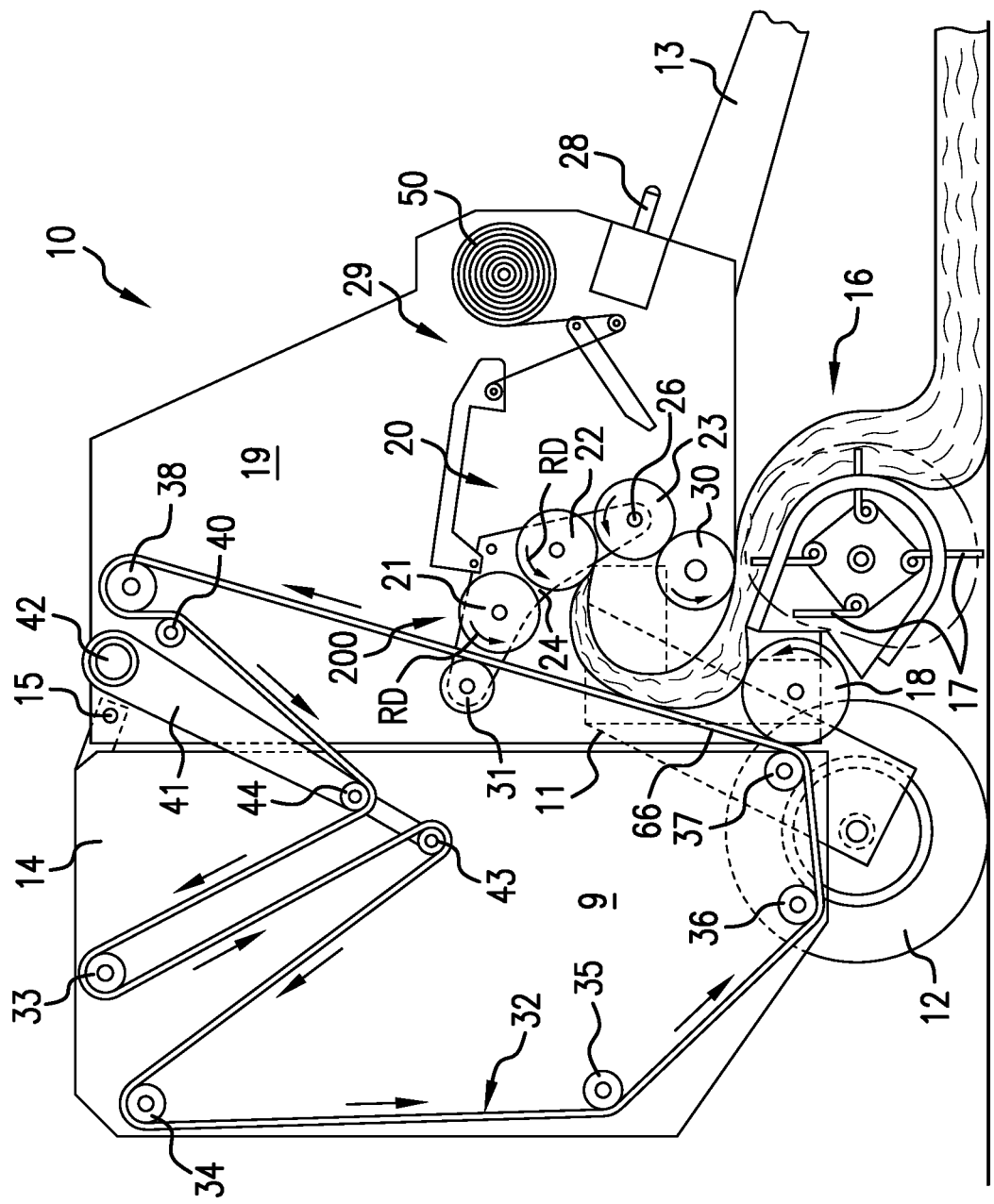
FIG. 1 illustrates a side sectional view of an exemplary embodiment of an agricultural baler including a wrapping assembly, provided in accordance with the present disclosure.

Referring now to the drawings, and more particularly to FIG. 1, an exemplary embodiment of a rotary or round baler 10 is illustrated having an expandable chamber defined in part by belts and rolls, as disclosed in U.S. Pat. No. 4,870,812, which is incorporated herein by reference. Baler 10 has a chassis 11, carrying a pair of side walls 19 (only one side wall is shown), supported by a pair of wheels 12 (only one wheel 12 shown). As used herein, a rotary or round baler 10 is a baler that produces a substantially cylindrical bale having a substantially round or circular cross section. A forwardly mounted tongue 13 is provided on chassis 11 for connection to a tractor. Pivotally connected to a side wall 19 by a pair of stub shafts 15 is a tailgate 14 which is closed during bale formation. A pickup 16, carried by chassis 11, includes tines 17 movable in a predetermined path to lift crop material from the ground and deliver it to a floor roll 18, rotatably mounted on chassis 11.

An expandable baling chamber 9 for forming bales is defined partly by a sledge assembly 20 including transversely extending bale-forming rolls 21, 22, 23 journalled at their ends in a pair of spaced arms 24, one of which is shown. These arms 24 are pivotally mounted on stub shafts 26 for providing movement of sledge assembly 20. Rolls 21, 22, 23 are driven in a rotation direction by, for example, chains and sprockets coupled to a drive shaft 28. The drive shaft 28 may be, for example, a power take-off. A starter roll 30, mounted on chassis 11, is also driven counter-clockwise. A freely rotatable idler roll 31, carried by arms 24, moves in an arcuate path with sledge assembly 20.

A wrapping mechanism 29 is mounted between side walls 19 on chassis 11 and sledge assembly 20 forwardly of the baling chamber 9. Wrapping material, such as a polymer sheet, net, twine, etc., is dispensed from a supply 50 of wrapping material, which may be a roll of wrapping material, to the chamber 9 via an opening between rolls 22 and 23.

The baling chamber 9 is further defined by an apron 32 comprising a plurality of continuous side-by-side belts supported by guide rolls 33, 34, 35, 36, 37 rotatably mounted in tailgate 14. Apron 32 is also supported by drive roll 38, mounted on chassis 11. Although apron 32 passes between roll 21 and idler roll 31, it is in engagement only with idler roll 31 and not roll 21. A suitable coupler connected to drive shaft 28 provides rotation of drive roll 38, causing movement of apron 32 in the directions indicated by the arrows in FIG. 1. An additional guide roll 40 ensures proper engagement between apron 32 and drive roll 38. A pair of take-up arms 41 (only one shown) is pivotally mounted on chassis 11 by a cross shaft 42 for movement between inner, intermediate and outer positions. Take-up arms 41, which carry additional guide rolls 43, 44 for supporting apron 32, are resiliently urged toward their inner positions.

When the elements of round baler 10 are disposed as shown in FIG. 1, an inner course 66 of apron 32 extends between guide roll 37 and idler roll 31 to form the rear wall of the core starting chamber 9, while the inwardly facing surfaces of rolls 21, 22, 23 define, in a general manner, a rearwardly inclined front wall. Floor roll 18 defines the bottom of the chamber 9, and with starter roll 30, provides an inlet for crop material.

When round baler 10 travels across a field, pickup tines 17 pickup crop material from the ground and convey it through the inlet. The crop material is conveyed by floor roll 18 into engagement with apron inner course 66 which urges the crop material upward and forward into engagement with the rolls on sledge assembly 20. In this manner, crop material is coiled in a clockwise direction to start a bale core. Continued feeding of crop material into the baling chamber 9 by pickup tines 17 causes apron inner course 66 to expand in length around a portion of the circumference of the bale core as the diameter increases. Take-up arms 41 rotate from their inner position toward their outer position to accommodate expansion of the inner course 66 of the apron in a well-known manner. After a bale has been formed and wrapped, tailgate 14 is opened and the bale is ejected rearwardly.

During bale formation, sledge assembly 20 moves between a bale-starting position to a full bale position. This movement causes idler roll 31 to move in an arcuate path while maintaining apron 32 in close proximity to roll 21, thereby allowing roll 21 to strip crop material from the belts and prevent or reduce significantly the loss of crop material between roll 21 and apron 32 during bale formation. Sledge assembly 20 is pushed outward towards its full bale position during bale formation as the crop material expands against rolls 21, 22, 23 and then subsequently is pulled inward by apron 32.

In known balers that form round bales, the formed bale is typically ejected out of the rear of the baler by opening a tailgate and allowing the bale to roll out of the baling chamber. If the bale is released while the baler is on an inclined surface, such as a hill, the bale may roll far more than desired. The uncontrollably rolling bale can present a safety hazard to people and property in the rolling path of the bale.

To reduce the risk of released bales rolling uncontrollably, and referring now to FIGS. 2-5, the baler 10 provided according to the present disclosure includes a protrusion inserter 210 and a controller 220 that is operably coupled to the wrapping mechanism 29 and the protrusion inserter 210. The protrusion inserter 210 is configured to insert a roll-reducing protrusion 211 on a surface 231 of a formed round bale 230. The roll-reducing protrusion 211 may be any object that extends radially from the surface 231 of the bale 230 and impedes rolling of the bale 230. The controller 220 is configured to output a wrap initiation signal to the wrapping mechanism 29 so the wrapping mechanism 29 begins wrapping the formed round bale 230 with wrapping material and output a protrusion insertion signal to the protrusion inserter 210 so the roll-reducing protrusion 211 is inserted on the surface 231 of the formed round bale 230 and is subsequently wrapped by wrapping material wrapped around the formed round bale 230 by the wrapping mechanism 29. The roll-reducing protrusion 211 is thus wrapped in wrapping material with the formed round bale 230 so the roll-reducing protrusion 211 is less prone to separating from the formed round bale 230 upon being released from the baling chamber 9.

The roll-reducing protrusion 211, by virtue of extending radially from the formed bale 230, extends further radially than a circumferential surface 401 (illustrated in FIG. 4) of the formed bale 230 to act as a stop that will impede rolling of the formed round bale 230 upon the roll-reducing protrusion 211 contacting a surface 410 on which the formed round bale 230 is rolling. In this respect, the surface on which the roll-reducing protrusion 211 is inserted can be the circumferential surface 401 of the formed bale 230 so the roll-reducing protrusion 211 extends axially across the circumferential surface 401 of the formed bale 230 upon being inserted. As can be appreciated from FIG. 4, the released formed round bale 230 may be initially released on the inclined surface 410 and roll in a direction R down the inclined surface 410, as illustrated in dashed-lines. The formed round bale 230 rolls down the inclined surface 410 until the roll-reducing protrusion 211, which is wrapped in wrapping material 402 to the formed round bale 230, comes into contact with the inclined surface 410, as illustrated in solid lines. Once the roll-reducing protrusion 211 contacts the inclined surface 410, further rolling of the bale 230 down the inclined surface 410 is impeded, and in the illustrated scenario prevented. Thus, the roll-reducing protrusion 211 reduces the risk of the formed round bale 230 uncontrollably rolling down the inclined surface 410.

Figure 2:
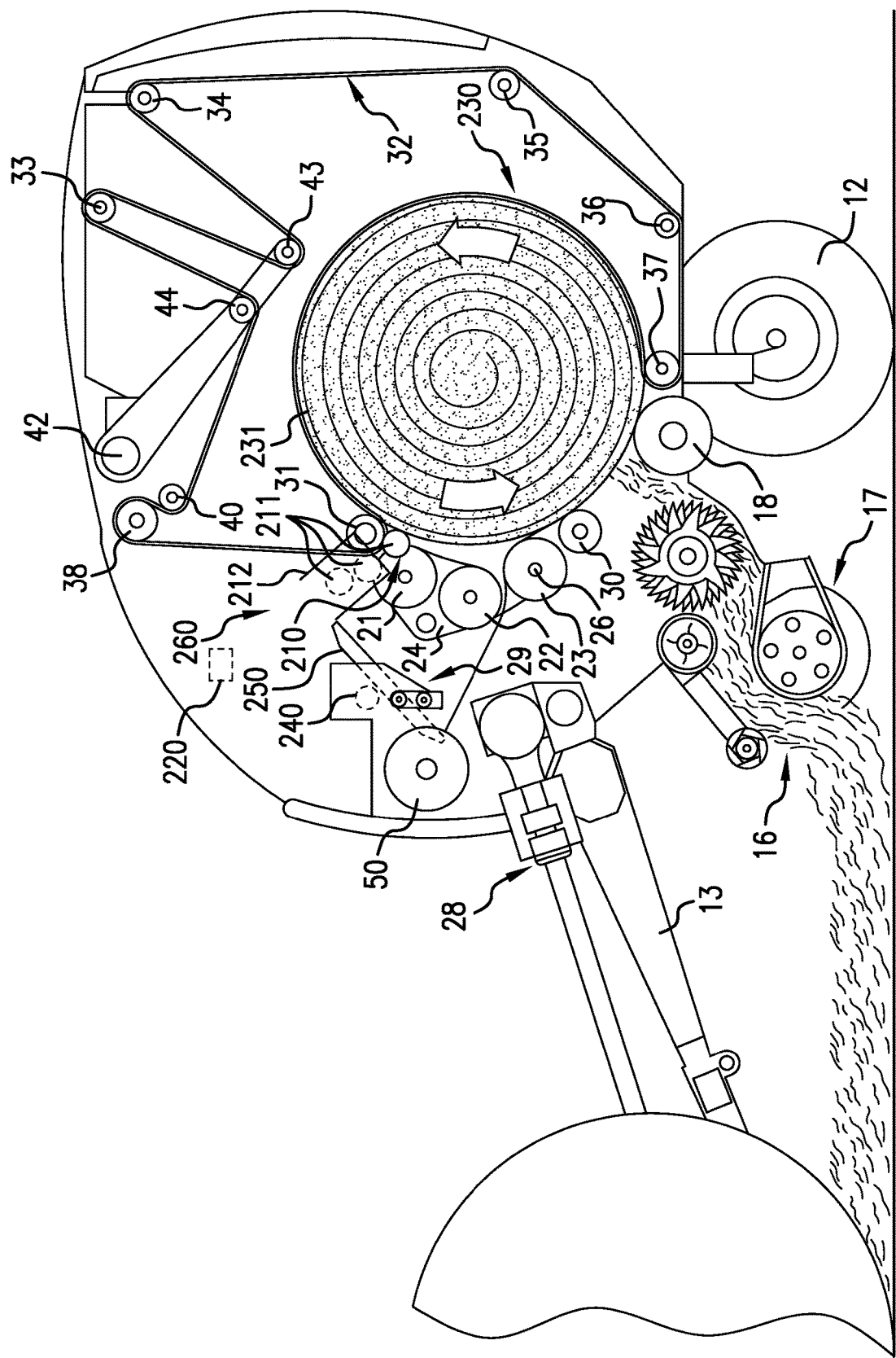
FIG. 2 illustrates a side sectional view of the agricultural baler of FIG. 1 when a protrusion inserter of the wrapping assembly is inserting a roll-reducing protrusion on a surface of a formed round bale that has been partially wrapped in wrapping material.
Figure 3:
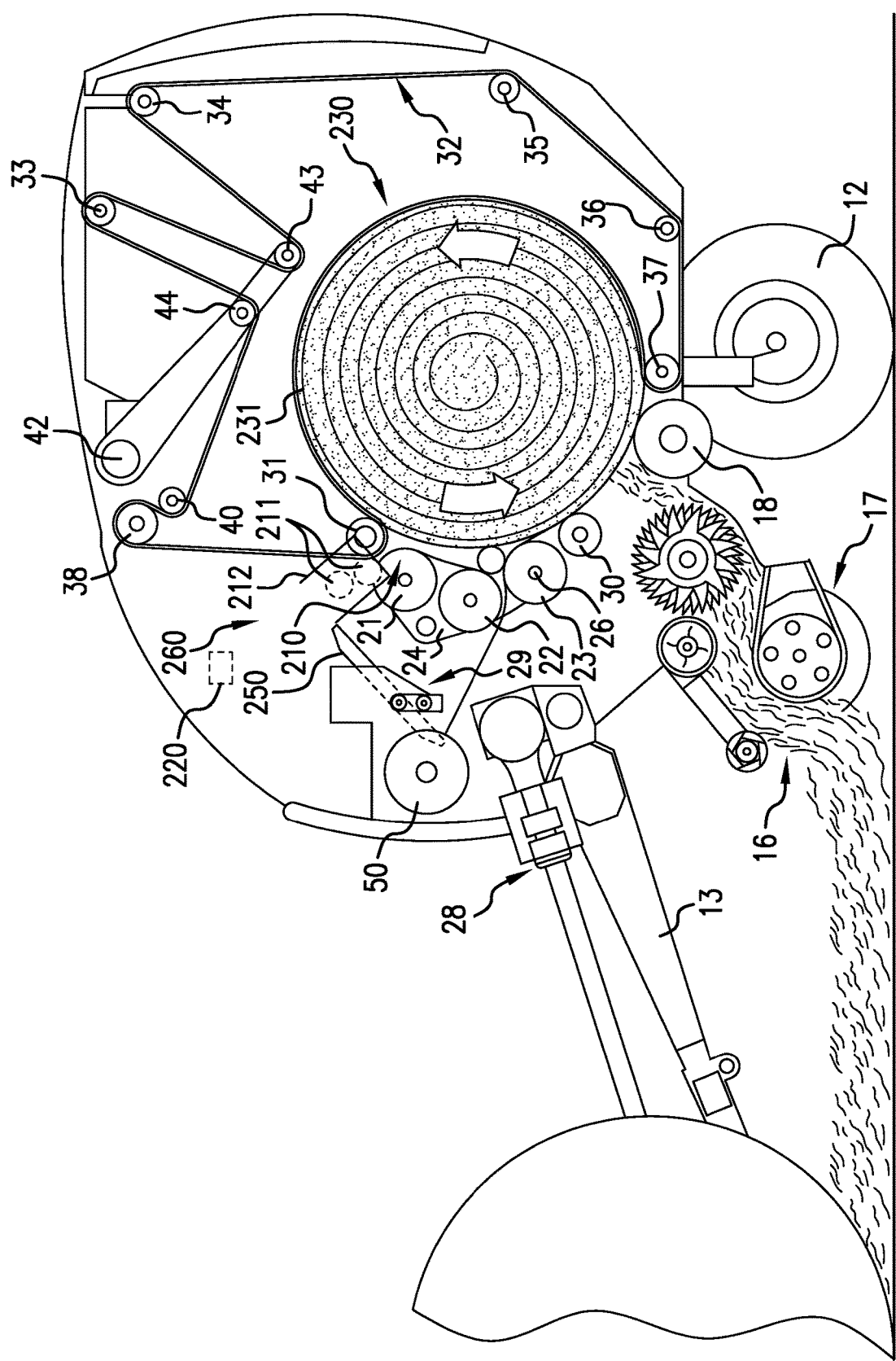
FIG. 3 illustrates a side sectional view of the agricultural baler of FIGS. 1-2 when the inserted roll-reducing protrusion of FIG. 2 is beginning to be wrapped by wrapping material.
Figure 4:
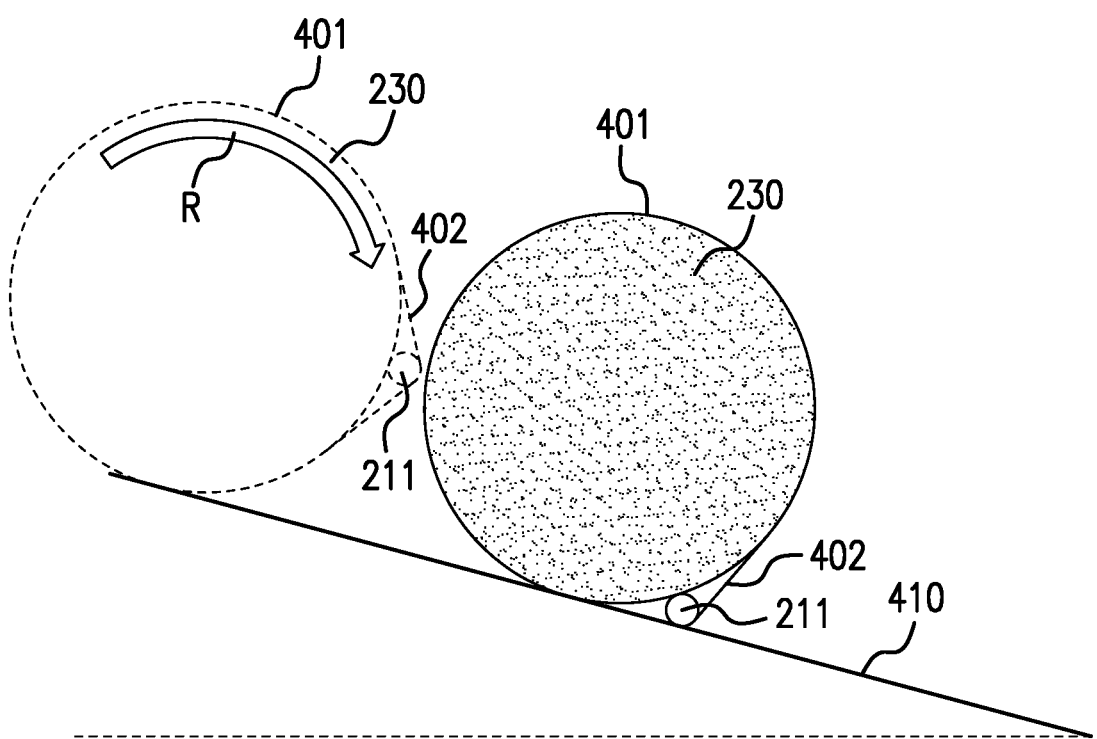
FIG. 4 illustrates a side view of a wrapped round bale including the roll-reducing protrusion when the wrapped round bale is rolling down a hill before coming to a stop due to the roll-reducing protrusion contacting the ground.

The controller 220 may be configured to output the protrusion insertion signal and cause insertion of the roll-reducing protrusion 211 by the protrusion inserter 210 at a variety of different times during the bale formation and wrapping cycle. In some embodiments, the controller 220 is configured to determine at least some wrapping material has been wrapped around the formed round bale 230 and output the protrusion insertion signal after determining the wrapping material has been wrapped around the formed round bale 230, as is illustrated in FIGS. 2-3. The controller 220 may be configured to determine at least some wrapping material has been wrapped around the formed round bale 230, for example, concurrently with or subsequently to the controller 220 outputting the wrap initiation signal to the wrapping mechanism 29. In some embodiments, the controller 220 may be configured to output the protrusion insertional signal concurrently with or subsequently to outputting the wrap initiation signal. If the controller 220 is configured to output the protrusion insertion signal subsequently to outputting the wrap initiation signal, the controller 220 may be configured to output the protrusion insertion signal upon the elapsing of a defined time period after the controller 220 outputs the wrap initiation signal. The controller 220 may be configured to output the protrusion insertion signal, for example, between 1 and 10 seconds after outputting the wrap initiation signal. In some embodiments, the controller 220 is configured to output the protrusion insertion signal after at least one layer of wrapping material has been wrapped around the formed round bale 230, e.g., one layer, two layers, three layers, or five or more layers. It should be appreciated, however, that the controller 220 may be configured to output the protrusion insertion signal after outputting the wrap initiation signal but prior to a full layer of wrapping material being wrapped around the formed round bale 230. In some embodiments, the controller 220 is configured to output the protrusion insertion signal such that the inserted roll-reducing protrusion 211 is wrapped in a defined number of layers of wrapping material, e.g., one layer of wrapping material or more than one layer of wrapping material such as two layers of wrapping material. It should thus be appreciated that the controller 220 can be configured in a variety of ways to control when the roll-reducing protrusion 211 is inserted on the surface 231 of the formed round bale 230 and subsequently wrapped by wrapping material.

Figure 5:
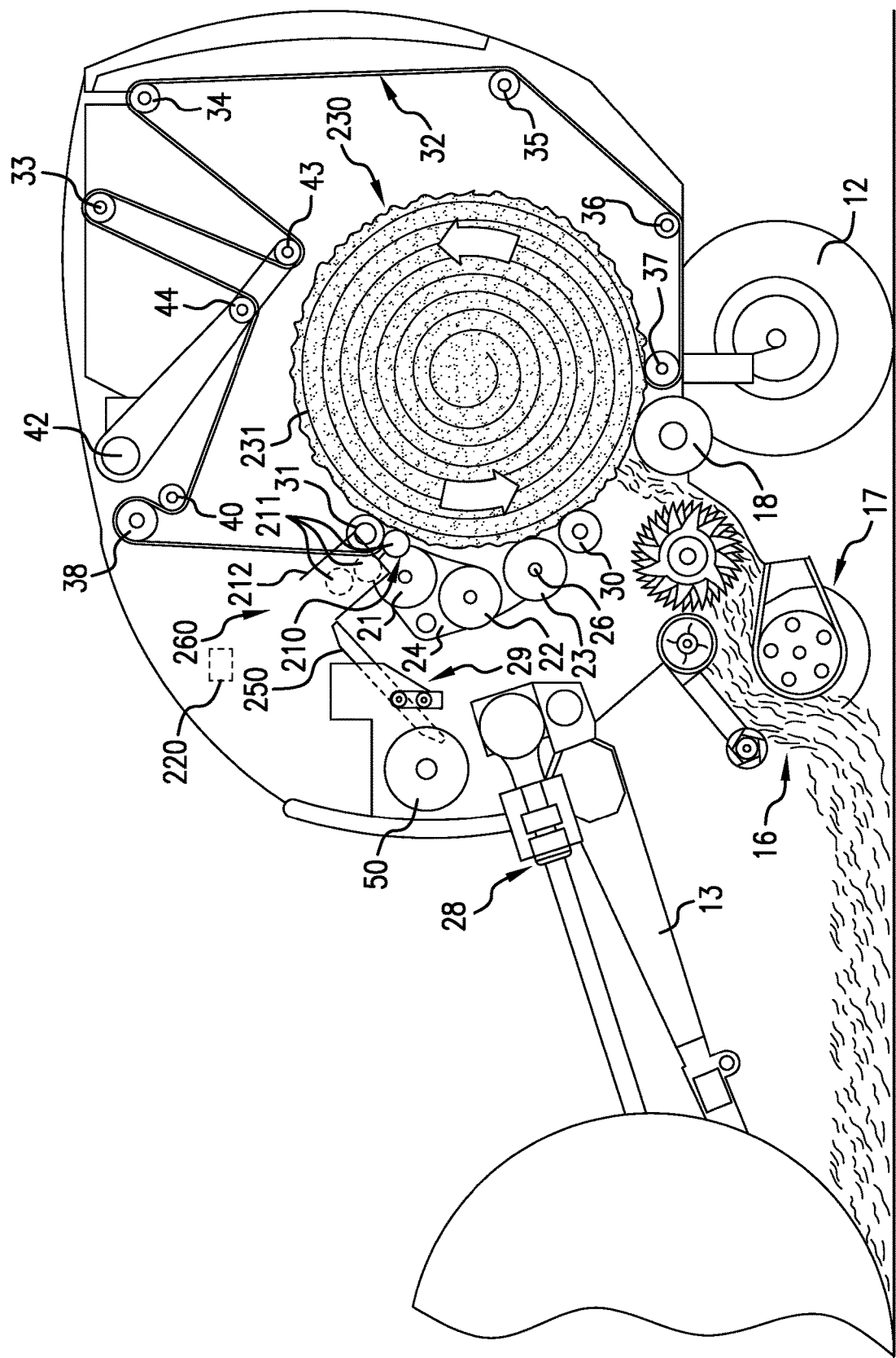
FIG. 5 illustrates a side sectional view of the agricultural baler of FIG. 1 when the protrusion inserter is inserting a roll-reducing protrusion on a surface of a formed round bale that has not been wrapped.

In some embodiments, as illustrated in FIG. 5, the controller 220 is configured to output the protrusion insertion signal prior to outputting the wrap initiation signal so the roll-reducing protrusion 211 is inserted on the surface 231 of the formed round bale 230 before any wrapping material is wrapped around the formed round bale 230. In such an embodiment, the formed round bale 230 and the inserted roll-reducing protrusion 211 will each be wrapped in generally the same number of layers of wrapping material before the wrapped bale 230 and protrusion 211 is released from the baling chamber 9. It should thus be appreciated that the roll-reducing protrusion 211 can be inserted on the surface 231 of the formed round bale 230 prior to any wrapping of the bale 230.

In some embodiments, the controller 220 is configured to receive an insertion adjustment signal that alters when the controller 220 outputs the protrusion insertion signal relative to the wrap initiation signal. For example, an operator may decide that the roll-reducing protrusion 211 should be inserted later during the wrapping in order to provide a tighter initial wrap of the formed round bale 230 and cause this adjustment by outputting the insertion adjustment signal, for example, via a display, smart device, or other input that is in communication with the controller 220. Thus, the controller 220 can be configured to adjustably cause insertion of the roll-reducing protrusion 211.

As previously described, the supply of wrapping material 50 may be a roll of wrapping material 50. When a defined amount of wrapping material, such as all of the wrapping material, has been pulled from the roll of wrapping material 50, the roll 50 is a spent roll of wrapping material. In known balers, the spent rolls of wrapping material are normally discarded. In some embodiments provided according to the present disclosure, spent rolls of wrapping material, indicated as element 240 in FIG. 2, are conveyed to the protrusion inserter 210 by a protrusion conveyor 250. The protrusion conveyor 250 may be, for example, an endless belt that rotates to convey the spent roll of wrapping material 240 to the protrusion inserter 210. However, it should be appreciated that the protrusion conveyor 250 does not necessarily need to convey spent rolls of wrapping material to the protrusion inserter 210. In some embodiments, the protrusion conveyor 250 simply represents a convenient way to supply a plurality of roll-reducing protrusions 211 to the protrusion inserter 211. The protrusion inserter 210 may, for example, include a reservoir 212 that is configured to hold a plurality of roll-reducing protrusions 211. The protrusion conveyor 250 may be configured to deliver roll-reducing protrusions, such as spent rolls of wrapping material 240, to the reservoir 212 where the roll-reducing protrusions 211 are held until being inserted by the protrusion inserter 210 onto the formed round bale 230. In some embodiments, the controller 220 is configured to determine a defined amount of wrapping material has been pulled from the roll of wrapping material 50 to become the spent roll of wrapping material 240 and output a protrusion conveyance signal to the protrusion conveyor 250 to convey the spent roll of wrapping material 240 to the protrusion inserter 210, e.g., to the reservoir 212 of the protrusion inserter 210. It should thus be appreciated that the wrapping assembly 200 provided according to the present disclosure can utilize spent rolls of wrapping material in a useful way, rather than simply discarding the spent rolls, to reduce waste.

Figure 6:
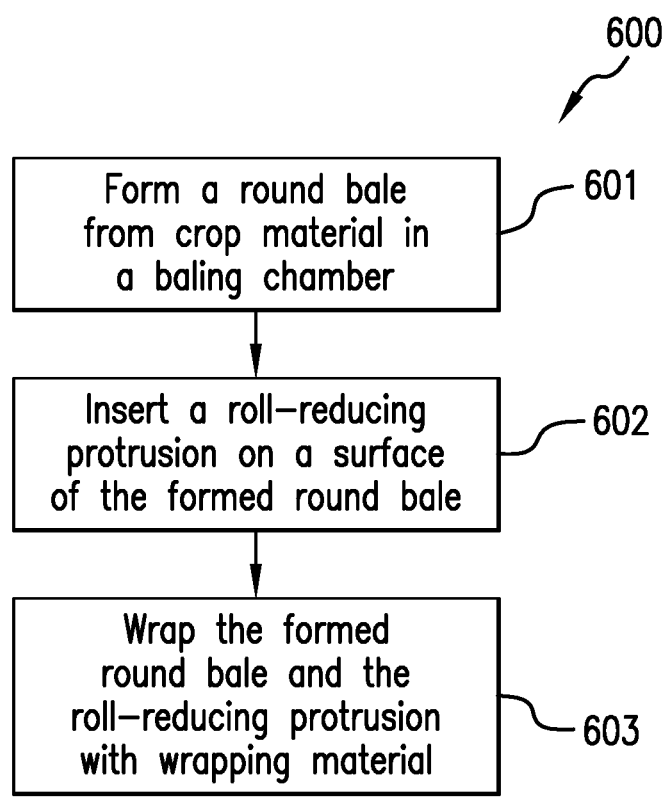
FIG. 6 is a flow chart illustrating an exemplary embodiment of a method of forming a round bale with an agricultural baler, provided in accordance with the present disclosure.

Referring now to FIG. 6, an exemplary embodiment of a method 600 of forming a round bale with an agricultural baler, such as the agricultural baler 10, provided according to the present disclosure is illustrated. The method 600 includes forming 601 the round bale 230 from crop material in the baling chamber 9; inserting 602 the roll-reducing protrusion 211 on the surface 231 of the formed round bale 230; and wrapping 603 the formed round bale 630 and the roll-reducing protrusion 211 with wrapping material from the supply of wrapping material 50 to produce a wrapped round bale with the roll-reducing protrusion 211 wrapped in the wrapping material 402 and extending from the wrapped round bale in a manner that inhibits rolling of the wrapped round bale after ejection from the baling chamber 9. The roll-reducing protrusion 211 may be inserted 602 prior to wrapping 603 the formed round bale 230 and the roll-reducing protrusion 211 or, alternatively, the roll-reducing protrusion 211 may be inserted 602 after wrapping at least some wrapping material to the formed round bale 630. The roll-reducing protrusion 211 may be, for example, a spent roll of wrapping material 240 and/or may extend axially across the circumferential surface 401 of the formed round bale 230 upon being inserted 602.

From the foregoing, it should be appreciated that the agricultural baler 10 including the wrapping assembly 200 provided according to the present disclosure can produce round bales that are less likely to roll down inclined surfaces. The formed round bales 230 can be made less likely to roll by inserting and wrapping the roll-reducing protrusion 211 to the formed round bale 230, with the inserting being easily incorporable into the wrapping cycle. Further, the roll-reducing protrusion 211 can be, for example, a spent roll of wrapping material 240 to reduce waste. Therefore, the agricultural baler 10 including the wrapping assembly 200 provided according to the present disclosure provides a convenient way to reduce the risk of released bales uncontrollably rolling after ejection.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A wrapping assembly for an agricultural baler, comprising:
    a supply of wrapping material;
    a wrapping mechanism configured to wrap the wrapping material around a formed round bale;
    a protrusion inserter configured to insert a roll-reducing protrusion on a surface of the formed round bale, the roll-reducing protrusion being positioned on the surface of the formed round bale and sized to inhibit rolling of the formed round bale on a ground surface after ejection from the baler; and
    a controller operably coupled to the wrapping mechanism and the protrusion inserter, the controller being configured to:
        output a wrap initiation signal to the wrapping mechanism so the wrapping mechanism begins wrapping the formed round bale; and
        output a protrusion insertion signal to the protrusion inserter so the roll-reducing protrusion is inserted on a surface of the formed round bale and is subsequently wrapped by wrapping material wrapped around the formed round bale by the wrapping mechanism.

2. The wrapping assembly of claim 1, wherein the controller is configured to output the protrusion insertion signal prior to outputting the wrap initiation signal.

3. The wrapping assembly of claim 1, wherein the controller is further configured to determine at least some wrapping material has been wrapped around the formed round bale and output the protrusion insertion signal after determining at least some wrapping material has been wrapped around the formed round bale.

4. The wrapping assembly of claim 1, wherein the supply of wrapping material comprises a roll of wrapping material.

5. The wrapping assembly of claim 4, further comprising a protrusion conveyor configured to convey a spent roll of wrapping material to the protrusion inserter.

6. The wrapping assembly of claim 5, wherein the controller is further configured to:
    determine a defined amount of wrapping material has been pulled from the roll of wrapping material to become the spent roll of wrapping material; and
    output a protrusion conveyance signal to the protrusion conveyor to convey the spent roll of wrapping material to the protrusion inserter.

7. The wrapping assembly of claim 1, wherein the protrusion inserter comprises a reservoir configured to hold a plurality of roll-reducing protrusions.

8. An agricultural baler, comprising:
    a chassis;
    a pickup carried by the chassis and configured to pick up crop material;
    a baling chamber carried by the chassis and configured to receive picked up crop material, the baling chamber comprising a roll assembly configured to form a round bale from picked up crop material; and
    a wrapping assembly carried by the chassis and comprising:
        a supply of wrapping material;
        a wrapping mechanism configured to wrap the wrapping material around a round bale formed by the baling chamber;
        a protrusion inserter configured to insert a roll-reducing protrusion on a surface of the formed round bale, the roll-reducing protrusion being positioned on the surface of the formed round bale and sized to inhibit rolling of the formed round bale on a ground surface after ejection from the baling chamber; and
        a controller operably coupled to the wrapping mechanism and the protrusion inserter, the controller being configured to:
            output a wrap initiation signal to the wrapping mechanism so the wrapping mechanism begins wrapping the formed round bale; and
            output a protrusion insertion signal to the protrusion inserter so the roll-reducing protrusion is inserted on a surface of the formed round bale and is subsequently wrapped by wrapping material wrapped around the formed round bale by the wrapping mechanism.

9. The agricultural baler of claim 8, wherein the controller is configured to output the protrusion insertion signal prior to outputting the wrap initiation signal.

10. The agricultural baler of claim 8, wherein the controller is further configured to determine at least some wrapping material has been wrapped around the formed round bale and output the protrusion insertion signal after determining at least some wrapping material has been wrapped around the formed round bale.

11. The agricultural baler of claim 8, wherein the supply of wrapping material comprises a roll of wrapping material.

12. The agricultural baler of claim 11, wherein the wrapping assembly further comprises a protrusion conveyor configured to convey a spent roll of wrapping material to the protrusion inserter.

13. The agricultural baler of claim 12, wherein the controller is further configured to:
   determine a defined amount of wrapping material has been pulled from the roll of wrapping material to become the spent roll of wrapping material; and
   output a protrusion conveyance signal to the protrusion conveyor to convey the spent roll of wrapping material to the protrusion inserter.

14. The agricultural baler of claim 8, wherein the protrusion inserter comprises a reservoir configured to hold a plurality of roll-reducing protrusions.

15. The agricultural baler of claim 8, wherein the protrusion inserter is configured to insert the roll-reducing protrusion on a circumferential surface of the formed round bale.

16. A method of forming a round bale with an agricultural baler, the method comprising:
   forming the round bale from crop material in a baling chamber;
   inserting a roll-reducing protrusion on a surface of the formed round bale; and
   wrapping the formed round bale and the roll-reducing protrusion with wrapping material from a supply of wrapping material to produce a wrapped round bale with the roll-reducing protrusion wrapped in the wrapping material and extending from the wrapped round bale in a manner that inhibits rolling of the wrapped round bale after ejection from the baling chamber.

17. The method of claim 16, wherein the roll-reducing protrusion is inserted on the surface of the formed round bale prior to wrapping the formed round bale and the roll-reducing protrusion.

18. The method of claim 16, wherein the wrapping comprises wrapping at least some wrapping material to the formed round bale and the inserting comprises inserting the roll-reducing protrusion after wrapping at least some wrapping material to the formed round bale.

19. The method of claim 16, wherein the roll-reducing protrusion is a spent roll of wrapping material.

20. The method of claim 16, wherein the roll-reducing protrusion extends axially across a circumferential surface of the formed round bale upon being inserted.

* * * * *